Jan. 11, 1966  E. HITZELBERGER  3,228,156
WINDOW ARRANGEMENT IN VEHICLES
Filed Oct. 4, 1961  2 Sheets-Sheet 1

INVENTOR.
ERWIN HITZELBERGER
BY Dicke and Craig
ATTORNEYS.

Jan. 11, 1966  E. HITZELBERGER  3,228,156
WINDOW ARRANGEMENT IN VEHICLES
Filed Oct. 4, 1961  2 Sheets-Sheet 2

INVENTOR.
ERWIN HITZELBERGER
BY Dicks and Craig
ATTORNEYS.

United States Patent Office 3,228,156
Patented Jan. 11, 1966

3,228,156
WINDOW ARRANGEMENT IN VEHICLES
Erwin Hitzelberger, Stuttgart-Rohr, Germany, assignor to Daimler-Benz Aktiengesellschaft, Stuttgart-Unterturkheim, Germany
Filed Oct. 4, 1961, Ser. No. 142,864
9 Claims. (Cl. 52—208)

The present invention relates to a construction and arrangement of windowpanes in motor vehicles, and more particularly relates to the support and sealing arrangements of the windowpanes and side windows in motor vehicles.

The present invention aims at producing a clear-vision windowpane arrangement intended especially for motor vehicle constructions which may be readily manufactured, enables a particularly simple installation of the windowpane and, notwithstanding such advantageous features, assures a very good sealing arrangement. Additionally, separating edges for the air stream to change the same from laminar to turbulent flow are to be produced by the arrangement in accordance with the present invention of the windowpanes whereby the position, especially of the side windows, in relation to the driving direction of the vehicle becomes non-critical as regards any noise formation by approaching air stream and the noise always present at higher driving speeds is considerably reduced.

The present invention essentially consists in so arranging and constructing the window support and sealing profile or section members that the latter are disposed at least along one edge thereof outside the surface of the windowpane, i.e., in a plane different from the plane of the window surface. In particular, the window support and sealing members may be disposed with respect to the plane of the surface of the windowpane in the direction toward the inside of the vehicle. The adjoining body parts or panels of the vehicle may then extend by the interposition of a gap approximately in extension of the surface of the windowpane. It is thereby particularly advantageous if at least one edge of the pane is disposed outside the contour of the outer vehicle body panels. The windowpane may then form at least along one edge thereof a step with the adjoining vehicle body parts. However, it may also be advantageous if the entire clear-vision windowpane is disposed outside of the contour of the outer vehicle body panels.

According to a further feature of the present invention, the windowpane may be provided, for purposes of connection thereof with the window support and sealing members, with an offset rim portion disposed outside the windowpane surface. However, it is also within the scope of the present invention to provide the clear-vision window with a profile-shaped part of appropriate cross-section disposed outside of the windowpane surface and suitably bonded, glued, or cemented thereto or to form such profiled-shaped part by molding or casting during the manufacture of the pane.

According to still another feature of the present invention, the window supports and sealing means themselves may be disposed partly or entirely outside of the contour of the outer vehicle body parts or panels. Furthermore, it may be appropriate, for example, for an improved ventilation of the vehicle interior space, if seals are provided only along three edges of the clear-vision windowpane.

If the windowpanes are to be opened by pivoting or swinging, then it may be of advantage if the windowpane is pivotal about a shaft axis disposed within the area of the edge thereof. The windowpane may thereby be pivotal about a joint which is disposed either between the windowpane surface and the adjoining body parts of the vehicle or within the area of the windowpane surface or the extension thereof. In the second case, the joint may be constituted directly by the window support means of appropriate sectional shape and a bluge portion at the rim of the windowpane. The sealing profile-shaped members of appropriate cross-section may also be provided with lip portions the upper surfaces of which are inclined outwardly and downwardly with respect to the vehicle.

Accordingly, it is an object of the present invention to provide a mounting and sealing arrangement for the windowpanes such as the windshield, rear window and side windows of a motor vehicle which obviates the shortcomings of the prior art constructions.

Another object of the present invention resides in the provision of a mounting and sealing arrangement for the windowpanes of motor vehicles which is simple in construction, relatively inexpensive in manufacture and which may be readily installed while providing a good seal between the window and the adjointing vehicle body parts.

A further object of the present invention resides in the provision of a retaining and sealing arrangement for a window in a motor vehicle which de-emphasizes the criticality of the position of the window as regards noise generation and also effectively minimizes the noise produced, especially during high driving speeds by appropriately converting the laminar air stream into turbulent flow.

These and other objects, features and advantages of the present invention will become more obvious from the following description when taken in connection with the accompanying drawings which show, for purposes of illustration only, several embodiments in accordance with the present invention, and wherein FIGURE 1 is a schematic side elevational view of a passenger motor vehicle with a windowpane arrangement in accordance with the present invention;

Figure 1:
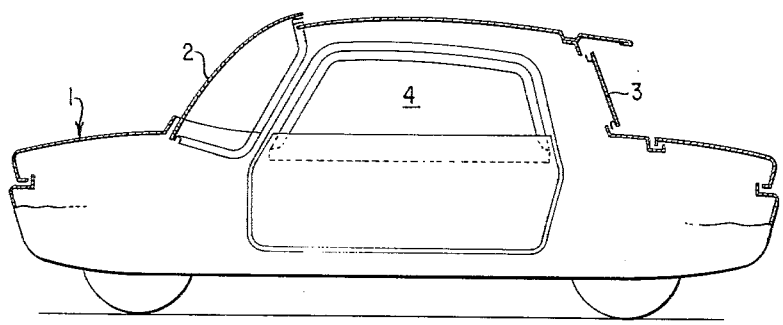

Referring now to the drawing wherein like reference numerals are used throughout the various views to designate corresponding parts, and more particularly to FIGURE 1 illustrating a passenger motor vehicle generally designated therein by reference numeral 1, the vehicle 1 includes a front windshield 2 and a rear window 3 the surfaces of which are disposed outside the contour of the outer body panels of the vehicle, and in which the sealing members extend both outside the plane of the windowpanes as well as outside the contour of the vehicle. The lowerable side windowpane 4 itself is disposed in the arrangement of FIGURE 1 within the vehicle contour; however, the window mounting and sealing means are arranged outside the window surface, i.e., not within the plane of the window surface. The particular manner of securing the different clear-vision windows provided in the vehicle of FIGURE 1 is illustrated on an enlarged scale, in cross section, in FIGURES 2 to 4.

Figure 2:
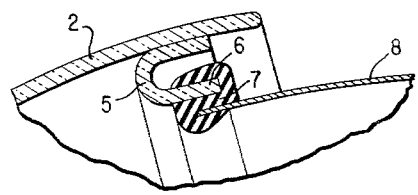
FIGURE 2 is a partial vertical cross sectional view, on an enlarged scale, through the upper edge of the windshield of the vehicle illustrated in FIGURE 1.
Figure 2A:
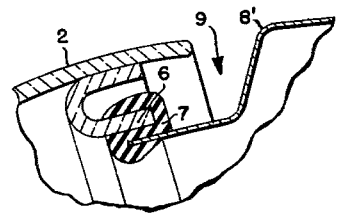
FIGURE 2a shows a modification of the construction illustrated in FIGURE 2.

As shown in FIGURE 2, a U-shaped sectional or profile-shaped member 5 is suitably bonded, glued or cemented along the rim of the windshield 2, which U-shaped part 5 may, in particular, also consist of glass and which engages with the free leg portion 6 thereof the window mounting and sealing member 7. The mounting and sealing member 7 of appropriate sectional shape is, therefore, arranged in the embodiment of FIGURE 2 outside of the surface of the windshield pane 2 and is displaced in the direction toward the vehicle interior. The windshield pane 2 is disposed with the upper and lateral rims thereof outside of the contour of the outer vehicle body panels and forms thereat a step with the adjoining vehicle body parts, of which only the roof sheet metal panel 8 is visible in FIGURE 2. The roof panel 8, however, could also be constructed in an offset manner and may therefore assume the contour indicated in FIGURE 2a by reference numeral 8'. In this case, the adjoining roof portion 8" continues by the interposition of a gap 9 approximately in extension of the surface of the windshield pane 2.

The rear window 3 is mounted in a similar manner as the front windshield 2, however, the sectional or profile-shaped part 10 is not bonded to the rear window 3 but is cast on or molded on integrally therewith during the manufacture of the windowpane 3.

Figure 4:
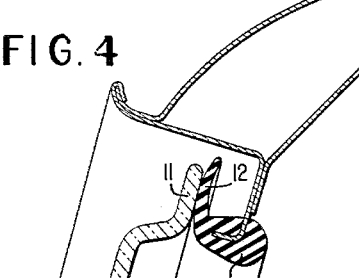
FIGURE 4 is a partial vertical cross sectional view through a side window of the vehicle illusrtated in FIGURE 1.
Figure 4A:
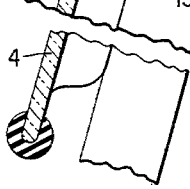
FIGURE 4a shows a modification of the construction illustrated in FIGURE 4.
Figure 4A:
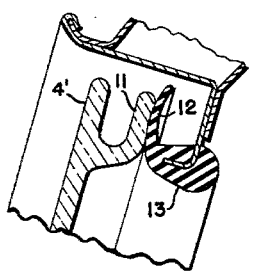

The side window 4 which is separately illustrated in FIGURE 4 is provided along the upper edge thereof with an offset rim portion 11 which abuts, with the window closed, against the lip portion 12 of the sectional or profile-shaped sealing member 13. As a result of such an arrangement there is achieved a particularly simple and good seal for the upper rim portion of the lowerable windowpane 4. In the place of a windowpane provided with an angularly bent rim portion as shown in full line in FIGURE 4, it would also be possible to use in connection with this embodiment a windowpane having a cast-on or molded-on portion similar to the portion 10 of the rear window 3. The side windowpane 4 would then include an extension 4' indicated in FIGURE 4a.

Figure 3:
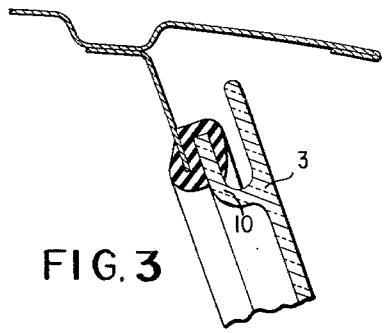
FIGURE 3 is a partial vertical cross sectional view, on an enlarged scale, through the upper edge of the rear window of the vehicle illustrated in FIGURE 1.
Figure 5:
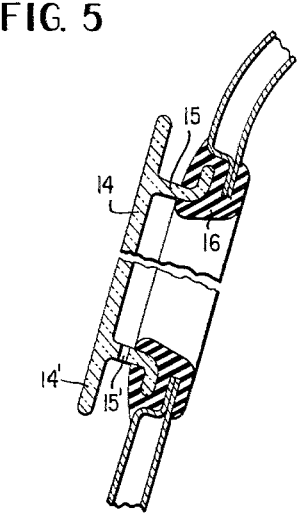
FIGURE 5 is a partial vertical cross sectional view, similar to FIGURE 3, of a modified embodiment of a window mounting and sealing arrangement in accordance with the present invention.

FIGURE 5 illustrates a vertical cross sectional view through a windowpane arrangement, particularly a rear window arrangement, which is similarly constructed as the one illustrated in FIGURE 3. As in FIGURE 3, a profile-shaped part 15 of appropriate cross-section is again molded-on or cast-on to the windowpane 14 along the entire rim thereof which part 15 engages with the free leg portion thereof in the window mounting and sealing member 16. As a particular feature, there are provided within the area of the lower rim of the windowpane 14, within the cast-on part 15 thereof, apertures 15' which assure a continuous ventilation of the vehicle interior space. The apertures 15' are protected toward the outside by the projecting rim 14' of the windowpane 14 against penetration of any dampness.

Figure 6:
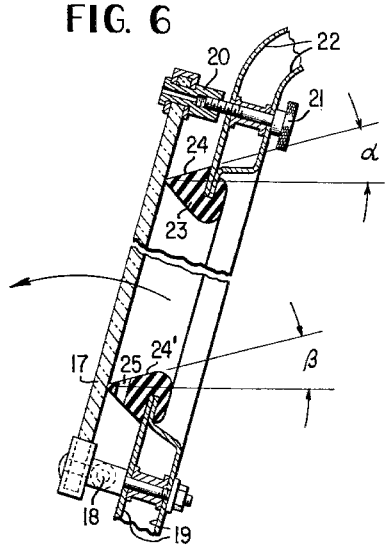
FIGURE 6 is a partial vertical cross sectional view through another modified embodiment of a window mounting and sealing arrangement in accordance with the present invention for use with a windowpane adapted to be swung about a horizontal axis.

FIGURE 6 illustrates a vertical cross sectional view through a further embodiment of a windowpane arrangement in accordance with the present invention in which a flat or planar clear-vision windowpane 17 is utilized. This pane 17 is secured along its lower rim by means of hinges 18 with the vehicle body wall 19. The joint of the hinge 18 is disposed between the windowpane surface and the adjoining outer body panels of the vehicle. The windowpane 17 is retained at the upper rim thereof by means of adjusting members which in the illustrated embodiment consist of a projection 20 secured at the windowpane 17 and provided with an internal thread and of a knurled head-screw 21 supported within the vehicle body part 22 of which the knurled head-screw 21 engages with the threaded part thereof within the internal thread of the projection 20. By rotating the knurled head-screw 21 it is possible to swing the windowpane 17 about the joint or pivot axis of the hinges 18. For purposes of sealing the windowpane 17 against the outer vehicle body walls, there is provided a profile-shaped sealing member 23 of appropriate cross section and made of rubber which extends along the entire periphery of the windowpane 17 and against which the windowpane 17 is pressed upon tightening the knurled head-screw 21. The lips of the profile-shaped sealing member 23 are so constructed that the upper surfaces 24 and 24' are inclined outwardly downwardly and form with the horizontal an angle $\alpha$ and $\beta$ respectively. In this manner, the rain water which enters at the upper rim of the windowpane 17 past the upper part of the sealing member can run off, at best, along the windowpane 17 and is thereupon caught by the channel effectively constituted by the surface 24' of the seal 23 and the window 17. Furthermore, apertures 25 for the ventilation of the vehicle interior space may be provided in the lower part of the seal 23 which simultaneously therewith enhance a discharge or removal of the rain water that might possibly have entered.

Figure 7:
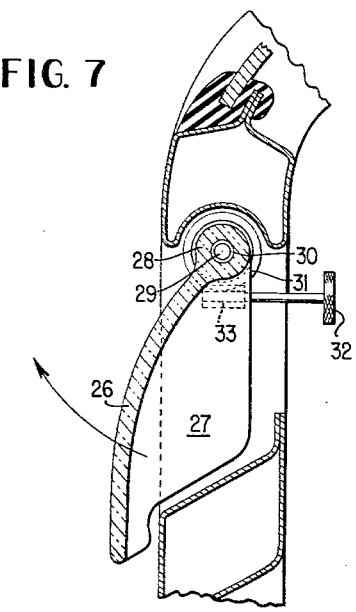
FIGURE 7 is a partial horizontal cross sectional view through a windowpane in accordance with the present invention adapted to be swung about a substantially vertical axis.
Figure 8:
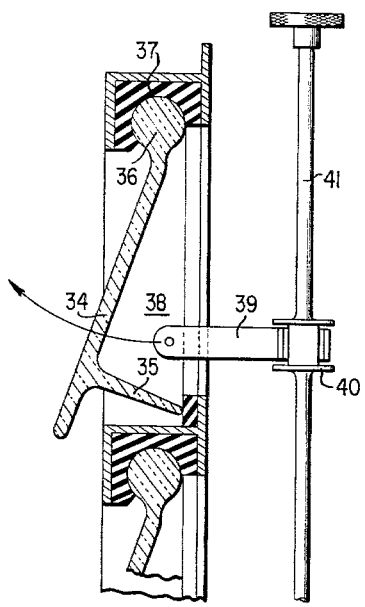
FIGURE 8 is a partial horizontal cross sectiontal view through a further modified embodiment of a windowpane in accordance with the present invention adapted to be swung about a substantially vertical axis.

FIGURES 7 and 8 show horizontal cross sectional views through two further embodiments of side windows which are adapted to be swung about a vertical axis. The window 26 illustrated in FIGURE 7 is constructed of arcuate shape and possesses along the upper and lower rims thereof lateral extensions 27 so that the windowpane, in its totality, forms a type of a blade-shaped body. The window 26 is provided along the forward edge thereof with a bulge-like portion 28 having a longitudinal bore 29 into which is inserted a steel shaft 30, for example, by being glued into this bore. The steel shaft 30 serves as bearing support of the window 26 in the superstructure of the motor vehicle, i.e., in the body or frame thereof, and, for example, may be provided at the lower end thereof with a worm gear 31 with which meshes a worm 33 provided with a hand wheel 32 for purposes of causing the swinging movements of window 26.

A still more simple construction for a clear-vision or transparent window adapted to be swung about a vertical axis is illustrated in FIGURE 8. The outer surface of the windowpane 34 illustrated in this embodiment is constructed of planar shape and possesses near the rear edge thereof a projection 35 directed toward the vehicle interior space and a bulge portion 36 at the forward edge thereof. The bulge portion 36 is embedded in a suitable window mounting and seal member 37 of appropriate sectional shape and is pivotally supported in this manner without any special auxiliary means. Still further surfaces are provided along the upper and lower edges of the windowpane 34 of which only the lower surface 38 is visible in FIGURE 8. The outer edges of this surface 38 connect the bulge portion 36 with the outer edge of the projection 35 so that the entire windowpane forms a sort of trough-shaped body. The surfaces 38 as well as the projection 35 serves for purposes of sealing the windowpane with respect to the outer vehicle body panels. For purposes of swinging the windowpane 34, a thin steel band or tape 39 is secured at the lower surface 38 which is adapted to be wound upon a drum 40. The steel band 39 is slightly arched in the transverse direction in the manner of a measuring tape so that it is also capable of transmitting thrust forces and is thereby capable to swing the windowpane 34 outwardly by unrolling the steel band 39 from the drum 40. Such an arrangement is particularly appropriate if, as indicated in FIGURE 8, a plurality of such windows are arranged, one behind the other, because the drum coordinated to each window could be mounted and secured on a common shaft 41 and be actuated from a single place, for example, from the driver's seat of a bus.

The windowpanes illustrated in FIGURES 7 and 8 are inclined with respect to the driving direction of the vehicle and are disposed with the rear edge thereof outside the contour of the outer vehicle body panels. These windowpanes, therefore, form, in a manner similar to the windshield 2 illustrated in FIGURE 2, separating edges for the approaching air stream to change the air stream from laminar to turbulent flow whereby the otherwise annoying wind noises are considerably reduced.

While I have shown and described several embodiments in accordance with the present invention, it is understood that the same is not limited thereto but is susceptible of many changes and modifications within the spirit and scope thereof, and I therefore do not wish to be limited to the details shown and described herein but intend to cover all such changes and modifications as are encompassed by the scope of the appended claims.

I claim:

1. A window arrangement, especially for motor vehicle superstructures, comprising transparent windowpane means, and means retaining said windowpane means in said vehicle superstructure, said windowpane means and said means retaining said windowpane means being the sole structure between the interior and exterior of the vehicle in that area of the vehicle superstructure, said retaining means being disposed outside the surface of said windowpane means in a direction toward the vehicle interior space, said windowpane means having freely protruding edges spaced from the surface of said superstructures and overlying said retaining means.

2. A window arrangement, especially for motor vehicle superstructures having outer body panels, comprising windowpane means, and means sealingly mounting said windowpane means in said vehicle superstructure, said windowpane means and said means sealingly mounting said windowpane means being the sole structure between the interior and exterior of the vehicle in that area of the vehicle superstructure, said mounting means being disposed outside the surface of said windowpane means, and the entire windowpane means being disposed outside the contour of the adjoining outer body panels, said windowpane means having freely protruding edges spaced from the surface of said superstructures and overlying said mounting means.

3. A window arrangement, especially for motor vehicle superstructures, comprising windowpane means, and mounting and sealing means sealingly retaining said windowpane means in said vehicle superstructure, said mounting and sealing means being disposed outside the surface of said windowpane means, and said windowpane means being provided with a sectional portion cast-on to said windowpane means and disposed outside the windowpane surface connecting said windowpane means with said mounting and sealing means said windowpane means having freely protruding edges spaced from the surface of said superstructures and overlying said mounting and sealing means, said windowpane means and said mounting and sealing means being the sole structure between the interior and exterior of the vehicle in that area of the vehicle superstructures.

4. A window arrangement, especially for motor vehicle superstructures provided with outer body panels, comprising windowpane means, and mounting and sealing means sealingly retaining said windowpane means in said vehicle superstructure, said mouting and sealing means being disposed outside the surface of said windowpane means, and said mounting and sealing means being disposed at least partly outside the contour of the outer body panels, said windowpane means having freely protruding edges spaced from the surface of said superstructures and overlying said mounting and sealing means, said windowpane means and said mounting and sealing means being the sole structure between the interior and exterior of the vehicle in that area of the vehicle superstructures.

5. A window arrangement, especially for motor vehicle superstructures having outer windowpane supporting body panels, comprising windowpane means including a transparent main vision portion and a portion adjacent one edge offset from the plane of said main vision portion, and sealing means sealing said offset portion to said body panels, said sealing means being disposed outside of the plane of said main vision portion and inwardly thereof in a direction towards the vehicle interior said windowpane means and said sealing means being the sole structure between the interior and exterior of the vehicle in that area of the vehicle superstructures.

6. A window arrangement as defined in claim 5 and wherein the windowpane supporting body panels continue in extension of at least one edge of said windowpane means with the interposition of a gap, and at least one other edge of said windowpane means being disposed outside of the contour of said supporting body panels.

7. A window arrangement as defined in claim 5 and wherein at least one edge of said windowpane means forms a step with said windowpane supporting body panels.

8. A window arrangement as defined in claim 5 and wherein said offset portion includes a section portion disposed between said windowpane means and said sealing means outside of the vehicle superstructure, said section portion having at least one aperture therethrough adjacent the lower portion of said main vision portion for providing drainage of condensation from said windowpane means.

9. A window arrangement, especially for motor vehicle superstructures, comprising windowpane means disposed outwardly of the vehicle superstructure including a main vision portion and a substantially annular sectional portion disposed adjacent the edges and extending outside of the plane of said main vision portion, and substantially annular mounting and sealing means sealingly retaining said windowpane means in said vehicle superstructure, said windwopane means and said mounting and sealing means being the sole structure between the interior and exterior of the vehicle in that area of the vehicle superstructure, said mounting and sealing means being secured to said sectional portions outside of the plane of said main vision portion and having at least a portion thereof engaging said vehicle superstructure, said windowpane means having freely protruding edges spaced from the surface of said superstructures and overlying said mounting and sealing means.

References Cited by the Examiner

UNITED STATES PATENTS

| 960,861 | 7/1910 | Estes. | |
|---|---|---|---|
| 1,703,355 | 2/1929 | Nielsen. | |
| 1,894,862 | 1/1933 | Grudnicki. | |
| 1,995,939 | 3/1935 | Osten. | |
| 2,236,615 | 4/1941 | Wheeler | 296—44 |
| 2,553,134 | 5/1951 | Darrin | 296—44 |
| 2,641,341 | 6/1953 | Touvay | 189–77 |

FOREIGN PATENTS 613,184   11/1926   France.

HARRISON R. MOSELEY, *Primary Examiner.*

NORTON ANSHER, *Examiner.*